United States Patent [19]

Boling et al.

[11] 4,174,476
[45] Nov. 13, 1979

[54] LASER CUTTING OF TUBULAR ARTICLES

[75] Inventors: Norman L. Boling; Michael E. Fein, both of Toledo, Ohio

[73] Assignee: Owens-Illinois, Inc., Toledo, Ohio

[21] Appl. No.: 904,729

[22] Filed: May 11, 1978

[51] Int. Cl.² .............................................. B23K 9/00
[52] U.S. Cl. ......................... 219/121 L; 219/121 LM; 350/171
[58] Field of Search ................... 219/121 L, 121 LM; 350/169, 3.6, 171, 163

[56] References Cited
U.S. PATENT DOCUMENTS

| | | | |
|---|---|---|---|
| 3,989,778 | 11/1976 | Osborne | 219/121 LM |
| 4,020,319 | 4/1977 | Shepard et al. | 219/121 LM |
| 4,048,464 | 9/1977 | Gale | 219/121 LM |

Primary Examiner—Bruce A. Reynolds
Assistant Examiner—Fred E. Bell
Attorney, Agent, or Firm—John R. Nelson; Myron E. Click; David H. Wilson

[57] ABSTRACT

Method and apparatus for cutting tubular material with two separate laser beams having a constant power ratio by using a laser source having a single output beam of random polarization. A beamsplitter is positioned so that the output of a laser source strikes it at a near normal angle of incidence. The beamsplitter divides the laser beam into two components whose power ratio remains relatively constant due to the near normal angle of incidence of the laser beam onto the beamsplitter. The two components are then directed to strike the tube. The constant power ratio permits the most efficient use of the power of the laser source.

8 Claims, 2 Drawing Figures

LASER CUTTING OF TUBULAR ARTICLES

BACKGROUND OF THE INVENTION

In the production of composite cans, several layers of material are spirally wound onto a mandrel in order to form what is referred to as a composite tube. The rotating tube advances down the mandrel as it is wound. As the tube advances, it is severed by cutting means which are generally carried on a reciprocating carriage.

Generally, composite tubes have been severed by means of knives which are intermittently forced against the rotating tube. This type of cutting method has inherent speed limitations which typically require that cutting be done in two steps. Initially, sections of tube containing several individual composite cans are cut off on the same machine where the tube is formed. Each section is then sent to a second machine, which recuts the section into individual can lengths.

In order to overcome the speed limitations of the mechanical cutting method described above, it has been proposed to use a laser beam as a means for cutting the tube. This would allow elimination of the recutting machine. Several U.S. patents disclose using a laser beam to cut material. U.S. Pat. No. 3,604,890, utilizes a laser to cut various materials. U.S. Pat. No. 3,690,744 discloses the use of a laser beam to form a line of weakness in laminated material. The use of lasers to cut off tubular bodies is disclosed in U.S. Pat. Nos. 3,960,624 and 3,679,863. Laser cutting has distinct advantages over the mechanical knife method, notably the cleanliness of the cut and the high attainable cutting speeds.

Because the wrapping angle of spirally wound composite cans is such that the tube rotates less than one revolution in the course of making a can, it is necessary to utilize two laser beams, each having enough power to completely cut through composite material. By utilizing two laser beams, the tube may be completely severed before it advances one can length. This allows time to reposition the laser beams so as to sever the next can from the tube. Each beam would be required to cut through one half of the circumference of a tube. One possible way of accomplishing this is to utilize two separate high power laser sources. For reasons of efficiency and economy, however, it is preferable to employ a single high power laser source and divide it into two separate beams in order to cut the tube.

There are many instances where it is useful to direct two separate laser beams to a workpiece. Often this is accomplished by employing a laser source having a single output beam and dividing it into two components by means of a beamsplitter. This type of use is disclosed in U.S. Pat. No. 3,604,890, where laser beams of different focal length are directed to a single area in order to cut various materials. In U.S. Pat. No. 3,410,203, a beamsplitter divides a laser into two components which are used in a non-impact printer. U.S. Pat. No. 3,778,585 utilizes a beamsplitter to provide two beams which are used to protect the laser source against backscatter damage. In U.S. Pat. No. 3,989,778 a beamsplitter is utilized to divide a laser beam into two components which are then directed to opposite sides of sheets of thermoplastic material which are to be sealed together. In all of the above U.S. Patents the beamsplitter is positioned so that the laser beam strikes it at a 45° angle.

In the cutting of composite tubes it is desirable to split a laser beam into two components which have a constant output and whose power ratio remains a constant in order to achieve greatest efficiency. The difficulty with this is that many lasers have unstable polarization characteristics (i.e. the polarization of the laser beam varies over time) and beamsplitters are polarization dependent at any angle of incidence other than normal. This polarization dependence is greatest at the commonly used angle of incidence of 45°. At angles of incidence near normal the polarization dependence is minimized. In other words, at near normal angles of incidence the degree of reflectivity of a beamsplitter is nearly constant despite varying polarization of the incident laser beam. The present invention relates to the cutting of composite tubes at two distinct points with a system employing only a single laser source.

SUMMARY OF THE INVENTION

The subject invention is a method and apparatus for cutting composite tubes with a laser beam. A laser beam is divided into two components by a beamsplitter. In order to minimize the effects that random polarization of the laser beam may have on the relative power of the two components, the beamsplitter is located so that the angle of incidence of the laser beam on the beamsplitter is near normal. The two laser beam components are directed to separate points on a composite tube by means of mirrors. The points on the tube may be on a circumference of the tube and diametrically opposed to one another, or they may be located at different points along the longitudinal axis of the tube. The tube rotates and is severed by the laser beam components. The use of two laser beam components permits the cutting of individual can lengths from the tube even though the length of each can is less than the amount of longitudinal travel of the tube during one rotation, and the orientation of the beamsplitter allows for more efficient use of laser power.

DETAILED DESCRIPTION OF THE DRAWINGS

Figure 1:
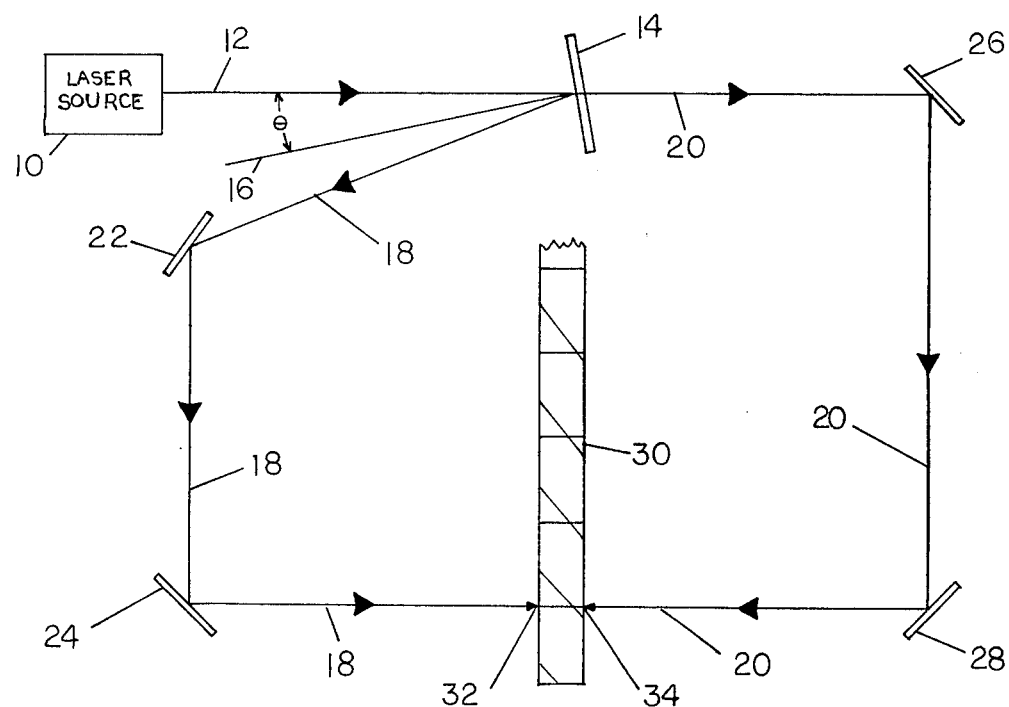
FIG. 1 is a diagram of an embodiment of the invention wherein two laser beam components are directed to diametrically opposed points on a circumference of a composite tube.

Referring to FIG. 1, a laser source 10, which in the preferred embodiment is a continuous wave $CO_2$ laser having a power output greater than 900 watts, generates a laser beam 12. The laser beam 12 strikes a beamsplitter 14 which divides the laser beam 12 into two components 18 and 20. The reflected laser beam component 18 is reflected by a pair of mirrors 22 and 24, while the laser beam component 20 which passes through the beam splitter 14 is reflected by a pair of mirrors 26 and 28. The number of mirrors and their positional arrangement is not critical, with the object simply being to control the paths of the two components 18 and 20. The components 18 and 20 are directed so as to strike a composite tube 30 at points 32 and 34, respectively. Auxiliary focussing or shaping devices such as lenses (not shown) may be used to control the precise energy distribution of the laser beam components 18 and 20 on the tube 30. The tube 30 is located on a forming machine (not shown) and is continuously rotating about its longitudinal axis. This rotation permits the tube 30 to be severed by the laser beam components 18 and 20. In the arrangement shown in FIG. 1, the laser beam components 18 and 20 strike the tube 30 at diametrically opposed points on a circumference 36 of the tube 30, thereby allowing for complete severance in one half of a rotation of the tube 30.

For most efficient operation, the two laser beam components 18 and 20 should be nearly equal in power and have just enough power to cut through the tube 30. Too little power would require more than one revolution for complete cutting, while too much power would result in wasted energy. In order to meet these requirements the beamsplitter 14 is designed to reflect and transmit approximately equal portions of the input energy, and is positioned so that the laser beam 13 strikes it at a near normal angle of incidence $\theta$. The angle of incidence $\theta$ of the beam 12 with respect to a line 16 normal to the beamsplitter should generally be less than 15°. The purpose of keeping the angle $\theta$ small is to minimize the effects of random polarization characteristics of the laser beam 12.

At the generally used angle of incidence of 45° the beamsplitter 14 will exhibit a relatively large variance in reflectivity as polarization of the laser beam 12 changes. This characteristic makes it difficult to keep the power of the laser beam components 18 and 20 equal and constant. In other words, as the polarization of the laser beam 12 changes, the power of one of the laser components 18 or 20 will increase while the power of the other laser components 18 or 20 will decrease. Since each laser beam component 18 and 20 must at all times have enough power to cut the tube 30, the power requirements of the laser beam 12 increase as the reflectivity variance of the beamsplitter 14 increases. For example, if each laser component 18 and 20 must be at least five hundred watts in order to cut the tube 30, the laser beam 12 would have to be at least one thousand watts if the reflectivity of the beamsplitter was always 50%. If, however, the reflectivity of the beamsplitter 14 varied plus or minus ten percent (i.e. from 40% to 60%), the power of the laser beam 12 would have to be at least 1250 watts (to insure that the 40% beam would be at least 500 watts). This would result in 250 watts of wasted power. One beamsplitter which may be utilized varies in reflectivity no more than plus or minus three percent as polarization of the laser beam 12 changes if the angle of incidence is less than 10° from normal. The properties of most commercially available beamsplitters are such that at angles of less than 15° with respect to normal the change in reflectivity due to varying polarization is less than 10%. The important point is to control the angle of incidence so that changes in reflectivity due to varying polarization are kept within acceptable limits for the particular beamsplitter which is used. By positioning the beamsplitter so that the angle of incidence is near normal, the power of the laser components 18 and 20 thus remains nearly constant and equal, which results in the most efficient operation.

Figure 2:
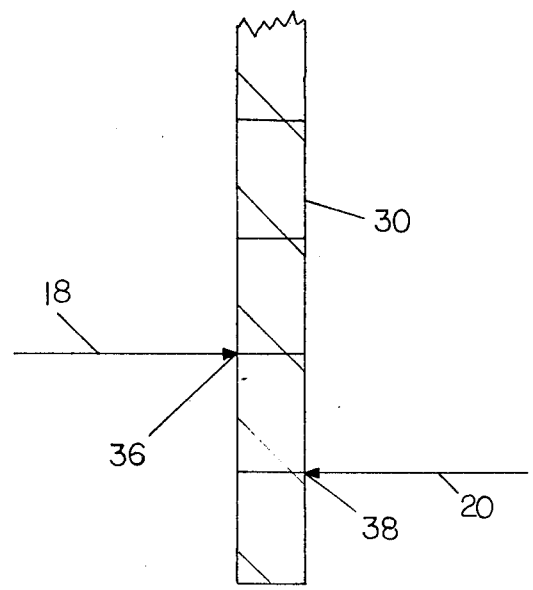
FIG. 2 is a diagram showing two laser beam components a composite tube at distinct points along the longitudinal axis of a composite tube.

Referring now to FIG. 2, it may be desired to direct the laser beam components 18 and 20 to strike tube 30 at two separate points 32 and 34 along the longitudinal axis of the tube 30. In this instance a full rotation of the tube is required to make a complete cut, but two sections at a time are severed from the tube 30. The actual cutting rate will be the same for both methods. The power requirements of the system also remain unchanged.

In the cutting of composite can material with the present invention, a continuous wave $CO_2$ laser with an output power of at least 900 watts is utilized. Although the invention described is utilized to sever composite tubes and employs a high power laser, the scope of the invention is such that it is useful wherever there is a requirement of two laser beams having a constant power ratio. For instance, one relatively high power laser beam may be needed to cut a particular material at one location, while a second lower power laser beam is required to make a score line at another location in the material. The invention is thus not intended to be limited by the foregoing description but rather by the appended claims.

What is claimed is:

1. Apparatus for severing a rotating tubular article with a laser beam comprising:
    a laser source having a single output beam;
    a beamsplitter for dividing said output beam into two generally equal components, said beamsplitter being positioned so that said output beam strikes said beamsplitter at an angle of incidence $\theta$ with respect to a line normal to the beamsplitter that is greater than 0° and less 15°, thereby maintaining the power of said two components substantially equal despite random polarization of said output beams; and
    means for directing said two components to strike the peripheral surface of said tubular article, thereby allowing said tubular article to be completely severed during rotation of said tubular article.

2. The apparatus of claim 1 wherein the directing means causes the two components to strike diametrically opposed points on the peripheral circumference of said tubular article, thereby allowing said tubular article to be completely severed in one half revolution of said article about its longitudinal axis.

3. The apparatus of claim 1 wherein said laser source is a continuous wave $CO_2$ laser.

4. The apparatus of claim 3 wherein the output power of said laser source is greater than 900 watts.

5. The apparatus of claim 1 wherein the directing means causes the two components to strike the peripheral surface of said tubular article at two points spaced apart a preselected distance along the longitudinal axis of said tubular article, thereby allowing for said tubular article to be completely severed circumferentially at said spaced points in one full revolution of said article about its longitudinal axis.

6. A method of severing a rotating tubular article with a laser beam comprising the steps of:
    generating a laser beam;
    directing said laser beam towards a beamsplitter at an angle of incidence $\theta$ with respect to a line normal to said beamsplitter that is greater than 0° and less than 15°, thereby dividing said laser beam into two components having a constant power ratio; and
    directing said two components to strike the peripheral surface of said tubular article at two points thereon, thereby severing said tubular article as it rotates.

7. The method of claim 6 wherein said two components are directed to strike said tubular article at two points spaced apart a preselected distance along the longitudinal axis of said tubular article.

8. The method of claim 6 wherein said two components are directed to strike two diametrically opposed points on a circumference of said tubular article, thereby allowing said tubular article to be completely severed in one half of a revolution of the tubular articles about its longitudinal axis.

* * * * *